Aug. 17, 1926.  
W. WALSTEN  
1,596,326  
SORGHUM SEED TOPPER ATTACHMENT FOR ENSILAGE CUTTING MACHINES  
Filed April 8, 1924

Inventor  
W. Walsten

Patented Aug. 17, 1926.

1,596,326

UNITED STATES PATENT OFFICE.

WALTER WALSTEN, OF INMAN, KANSAS.

SORGHUM-SEED-TOPPER ATTACHMENT FOR ENSILAGE-CUTTING MACHINES.

Application filed April 8, 1924. Serial No. 705,048.

The invention relates to new and useful improvements in attachments for ensilage cutting machines and has for its principal object to provide a sorghum seed topper in connection therewith, whereby a means is provided for severing the seed bearing heads of the stalks before they are delivered to the ensilage cutter and are blown up into the silo.

It is a well known fact among stockmen using ensilage for feed that most of the sorghum seed after passing through the heating and fermenting process does not contain any more food value than an equal number of pounds of stalks and leaves from the same plant. Furthermore, for ensilage to provide a proper food product, it must be put into a silo in a matured state but still green. Owing to the value of the sorghum seed when used as a food or for planting the farmer has found it a loss in putting all of the same in the silo to provide ensilage, whereas if the seed were removed and threshed for sale, this procedure would be of a greater financial benefit to the farmer.

My invention further contemplates the provision of an attachment for an ensilage cutting machine of well known construction which is adapted to co-operate with the conveyor which feeds stalks to the ensilage cutter, a rotary cutter being associated with the attachment for severing the sorghum seed or heads from the stalks previous to the same being fed to the ensilage cutter.

A further object of the invention is to provide an attachment of the above mentioned character, which is to be actuated simultaneously with the operation of the conveyor and ensilage cutter and which will be simple in construction, inexpensive, strong and durable, and further well adapted for the purposes for which it is designated.

A further object resides in the provision of an attachment of the above mentioned character, upon an ensilage cutting machine wherein it is not necessary to alter the arrangement or construction of parts already on the machine so as to place the attachment in an operative position thereon.

Other objects and advantages of this invention will become apparent during the course of the following description.

In the accompanying drawing forming a part of the specification and in which like numerals designate like parts throughout the same:—

Figure 1:
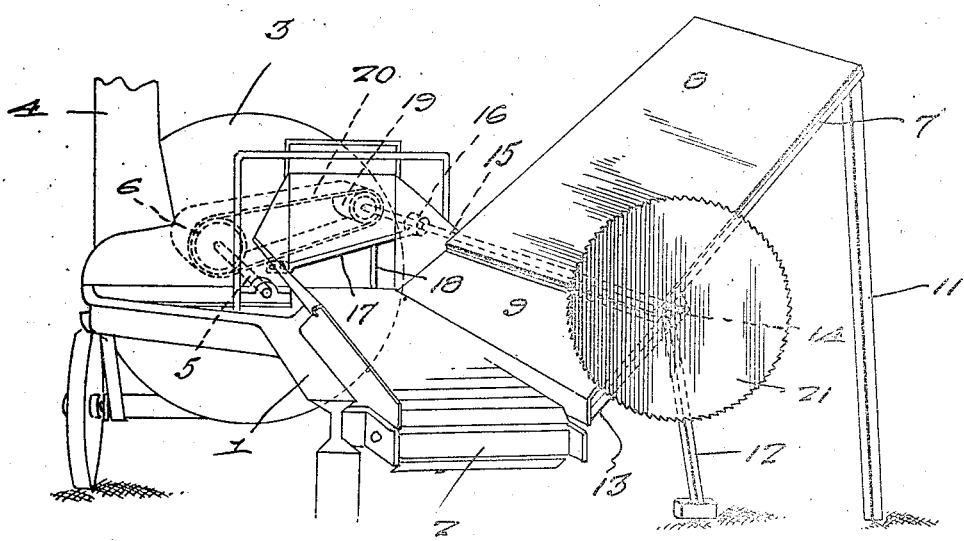
Figure 2:
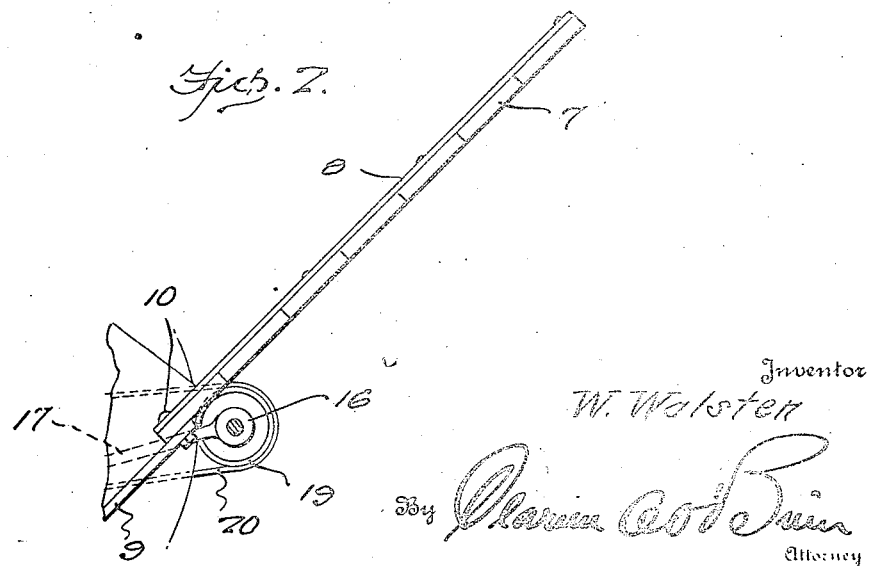

Figure 1 is a perspective view of an ensilage cutting machine of the well known type showing my attachment in position thereon, and Figure 2 is a side elevation of the inclined platform forming a part of my attachment.

In the drawing wherein for the purpose of illustration is shown the preferred embodiment of my invention, the numeral 1 designates generally an ensilage cutting machine of the well known construction which is provided with the longitudinally extending endless conveyor 2, the inner end of which is adapted to communicate with the drum 3 in which is mounted the usual rotary cutter for the purpose of cutting ensilage fed thereto previous to the same being blown to the silo through the pipe 4. The drive shaft actuating the cutter within the drum 3 is illustrated at 5 and is provided at its outer end with the pulley wheel 6 the purpose of which will hereinafter be more fully described. As the ensilage cutting machine above described may be of any well known construction, it is not thought necessary to further go into detail relative to the same.

My attachment which is adapted to be associated therewith comprises the inclined platform 7 which is formed of a series of strips of wood or the like and has a covering of galvanized sheet metal 8 extending over the upper face thereof for its entire surface in a manner as clearly shown in the drawing and the purpose of which will also be hereinafter more fully described. The lower portion of the platform or table 7 is secured to the upper longitudinal edge of the side plate 9 which extends at an angle from the frame 1 of the ensilage cutting machine adjacent the conveyor 2 in a manner as clearly shown in the drawing. Any suitable fastening means such as is shown at 10 in the drawing may be provided for securing the lower portion of the inclined platform 7 to the side plate 9.

For the purpose of supporting the upper portion of the inclined platform 7, I provide the supporting legs 11 and 12, respectively, in a manner as illustrated in Figure 1. This provides a means for rigidly supporting the platform in position with respect to the side plate 9 of the ensilage cutter frame and also in co-operative relation with the endless conveyor 2.

Extending outwardly from the frame 1 of the ensilage cutting machine and disposed below the side plate 9 adjacent the forward longitudinal side of the platform 7 is the angle iron 13. The outer end thereof co-operates with a suitable bearing block 14 in which is adapted to be supported one end of the transversely extending shaft 15. The opposite end of the transversely extending shaft 15 is journalled in a suitable bearing 16 provided on the outer end of the bracing member 17 which is supported on the frame 1 and has a leg portion 18 provided thereon for holding the same in proper position on the frame. The extreme outer end of the shaft 15 carries thereon the pulley wheel 19 which is in alignment with the pulley 6 mounted on the main drive shaft 5 and a suitable belt is adapted to extend around the pulley wheel whereby the drive shaft 5 will also actuate the shaft 15 journalled in the bearings 14 and 15.

The forward end of the shaft 15 is further adapted to support thereon a circular saw member 21 and the same will extend substantially adjacent the outer forward edges of the side plate 9 and the platform 7 in the manner as clearly shown in the drawing.

With the parts arranged as shown in Figure 1 of the drawing, instead of placing the bundles of sorghums such as cane, kafir-corn, millo-maize, or the like directly onto the endless conveyor 2 where the same will be fed to the rotary cutter mounted in the drum 3, the bundles are first placed on the upper edge of the inclined platform 7 and are adapted to slide down on the smooth sheet metal face 8 of the platform in such a manner as to have the heads of the stalks extending beyond the forward outer edge of the platform so that the circular saw 21 which is rotated in a manner as heretofore described, will sever the heads therefrom, the severed portions of which will be deposited on the ground, while the rest of the bundle will be caused to be discharged from the platform 7 and the side plate 9 onto the endless conveyor 2 where the same will be fed to the rotary cutter in the drum 3 from whence the same are adapted to be blown through the pipe 4 into the silo in its green stage wherein the same contains the natural juices of the plant which is necessary to make a succulent feed. It is to be understood of course, that the heads of the sorghums which have been severed by the circular saw 21 and have been deposited on the ground directly below the saw will be gathered up and placed in suitable containers for future use.

It will thus be seen from the foregoing description, that a sorghum seed topper attachment for an ensilage cutting machine has been provided which will not in any way interfere with the operation of the ensilage cutting machine but will save the loss of the seed which heretofore has been discharged into the silo together with the cut up stalks. Furthermore, an attachment of the above mentioned character, may be easily and readily disassembled from the ensilage cutting machine when it is not desired to use the same, and will not in any way require the alteration of any of the parts of the ensilage cutter in order to place the same in position thereon.

While I have shown the preferred embodiment of my invention, it is to be understood that various changes in the size, shape and arrangement of parts may be resorted to without departing from the spirit of the invention or the scope of the appended claim.

Having thus described my invention, what I claim is:—

An attachment for a conventional ensilage cutting machine comprising a platform adapted to be supported in right angular relation on one side of the machine, said platform having a smooth surface upon which the ensilage is adapted to be placed to gravitate downwardly, means for supporting the platform in a downwardly inclined position, a bracket adapted to be attached to the ensilage cutting machine, said bracket being provided at its outer end with a bearing, an angle bar in association with said platform, said bar being provided with a bearing, a shaft rotatably mounted in said bearing, and a rotary cutter carried by said shaft and disposed at the lower end of said platform.

In testimony whereof I affix my signature.

WALTER WALSTEN.